Dec. 4, 1945.  W. P. POWERS  2,390,122
GAUGE
Filed March 18, 1943
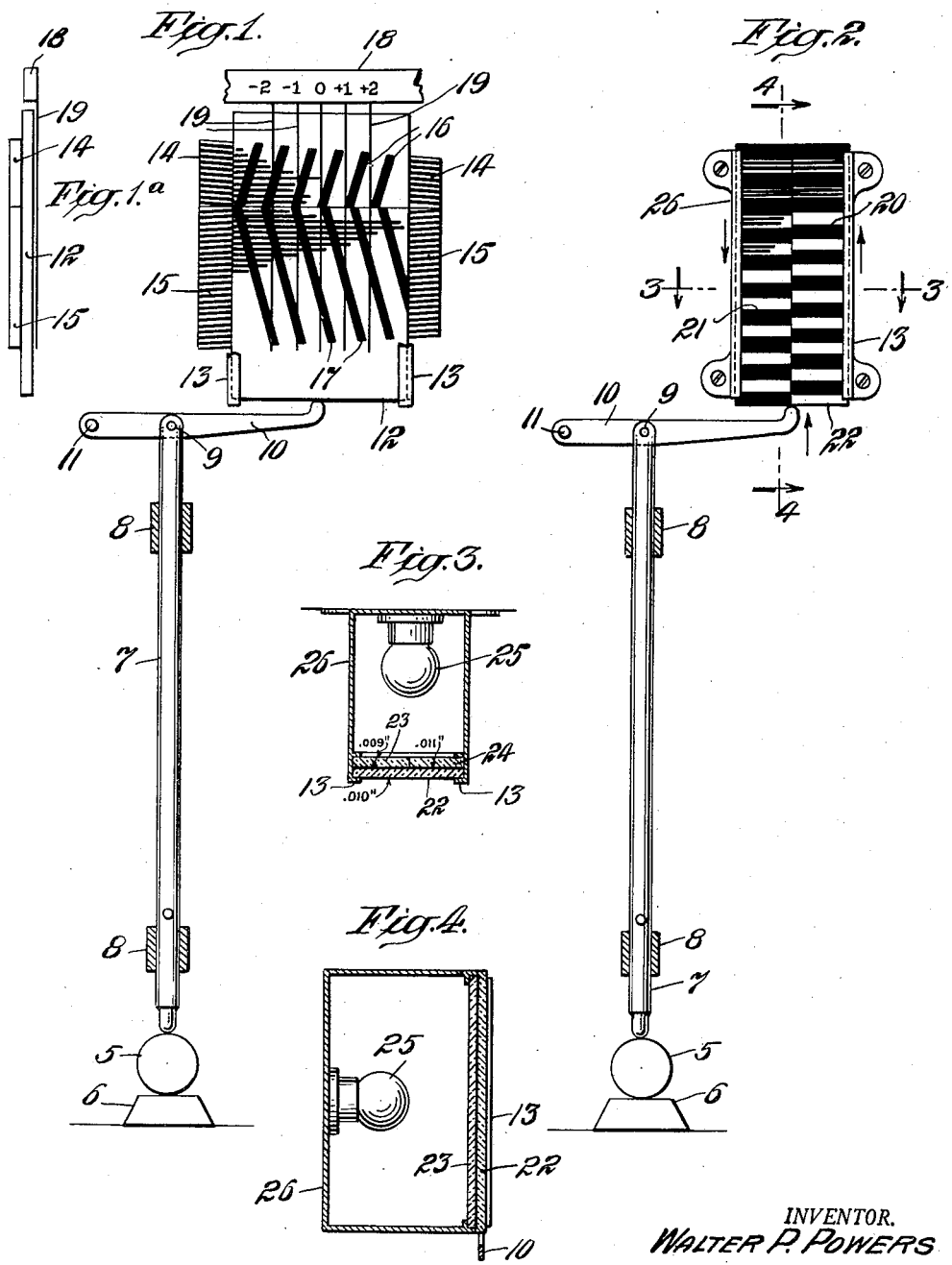
INVENTOR.
WALTER P. POWERS
BY
Philip S. McLean
ATTORNEY Patented Dec. 4, 1945

2,390,122

UNITED STATES PATENT OFFICE 2,390,122

GAUGE

Walter P. Powers, Newark, N. J., assignor to Associated Patentees, Inc., Ampere, N. J., a corporation of New Jersey Application March 18, 1943, Serial No. 479,543

4 Claims. (Cl. 88—14)

The invention herein disclosed relates to instruments in the nature of gauges, particularly such as limit gauges, calipering devices, comparators and the like.

Attention is directed to earlier patents to Walter P. Powers 2,246,001 and 2,246,002 of June 17, 1941, as disclosing the principle utilized in the present invention of effecting relatively great and easily read indications by very slight variations through the medium of grids or screens lined or arranged in vernier relation to create phantom or shadow pointers.

Also reference is made to a companion application filed February 24, 1943, Ser. No. 476,987, now Patent No. 2,360,581 of October 17, 1944, in which the basic principle is employed to provide a particularly simple and direct acting measuring or gauging device.

The present invention has generally the same broad purposes as the companion application referred to, that is, to provide a gauge device of simple construction and direct action, which will show in easily read form, much magnified or exaggerated, variations detected by the sizing or other form of sensing element.

Particular objects of the present invention are to create the effect of easily read vernier scales which, from the same impulse, will travel in opposite directions, giving a sense of motion facilitating the quick reading of the instrument.

Other desirable objects will appear as the specification proceeds.

The novel features of the invention through which attainment of the several objects is effected are set forth in the following specification, illustrated in the accompanying drawing and broadly covered in the claims.

In the drawing, there are shown by way of example, different practical forms the invention may take, but it is realized that structure may be further modified and changed all within the true intent and broad scope of the invention, as hereinafter defined and claimed.

Fig. 1 in the drawing is a fragmentary or diagrammatic face view of an instrument embodying features of the invention and used after the manner of a comparator.

Fig. 1a is an edge view of the relatively stationary and movable lined grids forming the indicating means at the top of the instrument shown in Fig. 1.

Fig. 2 is a diagrammatic front view similar to Fig. 1, of another embodiment of the invention.

Fig. 3 is a horizontal sectional view as on line 3—3 of Fig. 2.

Fig. 4 is a vertical sectional view as on line 4—4 of Fig. 2.

In the several views, the piece to be measured, compared or the like, is indicated at 5, inserted between the rest 6, and the end of a plunger or feeler 7.

The plunger, acting as a "sensing" element is shown as slidingly mounted in guides 8, and as pivotally connected at 9, with the short arm of a lever 10, pivotally mounted at 11.

The long arm of lever 10, is shown, in the first form of the invention as engaging a lined grid or screen 12, slidingly guided at 13, over the convergently lined, abutting grids or screens 14, 15.

In this first embodiment of the invention, all three grids may be alike in that they may each have the same arrangement of equally spaced lines and spaces.

The combined effect of the three, that is, the vertically movable, transversely lined front screen 12, over the convergently inclined relatively stationary screens 14, 15, is to create the optical effect of the two convergent larger mesh grids or scales 16, 17, inclined reversely to the lines of the convergently disposed back grids 14, 15. These larger and heavier convergent shadow grids or scales may meet exactly to produce a chevron or herringbone effect or, as shown in the illustration, there may be a vernier relation between the two scales so that the lines will meet exactly only at one point. This vernier relation may be created by having a slight variation in the size and spacing of the lines on the front grid and one of the back grids or by having these grids spaced sufficiently to create a slight angularity in viewing one through the other.

The three grids or screens may be made of glass, transparent plastic or other like material, ruled or lined as indicated, or they may be of metal or opaque material slotted to provide the light spaces between dark lined areas.

Slight vertical movements of the front or oversliding grid will produce greatly amplified movements of the larger reversely inclined shadow grids 16, 17, in opposite directions and these may be read as vernier scales to indicate very fine differences in dimensions, weight and other values.

If desired, a stationary reference or indicator scale may be related to the reversely traveling shadow scales, for example, as illustrated at 18, with the lines, wires or pointer elements 19, for registry with the shadow scales.

In the modified form of the invention illustrated in Figs. 2, 3, 4, the reversely shifting shadow scales 20, 21, are made to travel vertically, in the same plane of movement as the front, vertically shiftable lined grid 22, by providing relatively stationary horizontally lined grids 23, 24, at the back of the same, one of finer and the other of coarser pitch than the movable grid.

In the illustration, it may be considered that the movable grid is lined with a pitch of .010" and that grid 23, has a pitch of .009" and grid 24, has a pitch of .011" as indicated in Fig. 3. The shadow scale will travel in the same direction as the movement of the finer pitch scale. As a consequence, upward movement of screen 22, will create the effect of an upwardly moving scale at the right in Fig. 2, and a downwardly moving scale at the left in that figure.

This second illustrated form of the invention may have a stationary scale to cooperate with the movable reversely traveling shadow scales, as in the nature of that first shown.

The indicators may be illuminated by natural or artificial light, for example, by a lamp or lamps 25, located in a lamp housing 26, in back of the grids.

The differential relation between one grid and the two other grids provides two easily read oppositely moving indicating pointers or scales which may be read simply in conjunction with each other, like two vernier scales, or be read in association with some fixed index or scale. Means may be provided, if desired, for effecting initial adjustments of the parts. The two coplanar grids may be formed separately or both be integral portions of one and the same supporting medium. Also these two grids may constitute the movable element of the combination, or both elements of the combination be movable. The same or similar differential grid relation illustrated in Fig. 2 may be employed in the form of indicator first illustrated. Means may be provided for jointly or independently adjusting the inclination of the two back screens 14, 15, in Fig. 1, to thereby determine the angle of the reversely inclined shadow grids 16, 17, and to bring them to the same angle of inclination, so that they will properly register, after the manner represented in this figure.

What is claimed is:

1. An instrument of the character disclosed, comprising companion light screens in closely superposed relation and relatively movable one over the face of the other, one of said screens being composed of two grids in abutting edge-to-edge relation and the other screen consisting of a single grid overlying and cooperative with both the grids of the first mentioned screen, each of the three grids being composed of parallel opaque lines and intermediate clear spaces and with the lines and clear spaces of each grid of equal width and the lines of the three grids related to cause portions of the lines and spaces of the single grid to coincide periodically at regularly recurrent intervals with portions of the lines and spaces of the other two grids to form two contiguous optical grids of more widely spaced wider lines meeting in edge-to-edge relation, means for relatively shifting one light screen over the face of the other in a direction substantially at right angles to the abutting edges of the two grids to effect greater travel of said two optical grids in the edge-to-edge relation described, the lines of the two grids forming the first mentioned light screen being inclined convergently toward the abutting edges of the grids and the lines of the single grid of the other light screen extending at an angle to said direction of movement and to said convergent lines of the two grids, thereby creating relatively inclined lines in the movable optical grids, traveling in reverse directions with relative movement of the screens in one direction.

2. An instrument of the character disclosed, comprising companion light screens in closely superposed relation and relatively movable one over the face of the other, one of said screens being composed of two grids in edge-to-edge relation and the other screen consisting of a single grid overlying and cooperative with both the grids of the first mentioned screen, each of the three grids being composed of parallel opaque lines and intermediate clear spaces, with the lines of each grid all of substantially the same width and substantially uniformly spaced and the lines and spaces of the three grids relatively arranged to cause portions of the lines and spaces of the single grid to coincide periodically at regularly recurrent intervals with portions of the lines and spaces of one of the other grids and at regularly recurrent but different intervals with the lines and spaces of the other remaining grid to form two contiguous optical grids meeting in edge-to-edge relation and composed of opposed, more widely spaced wider lines with those of one optical grid spaced differently from the lines of the other optical grid, and means for effecting relative movement of said light screens one over the face of the other to produce travel of said optical grids in substantially parallel relation and at different linear speeds and whereby to effect magnified travel of said two optical grids with slight relative movement of the two screens and to maintain a vernier relationship in the consequent differential travel of said optical grids.

3. An instrument of the character disclosed, comprising companion light screens in closely superposed relation and relatively movable one over the face of the other, one of said screens being composed of two grids in edge-to-edge relation and the other screen consisting of a single grid overlying and cooperative with both the grids of the first mentioned screen, each of the three grids being composed of parallel opaque lines and intermediate clear spaces, with the lines of each grid all of substantially the same with and substantially uniformly spaced and the lines and spaces of the three grids related to cause portions of the lines and spaces of the single grid to coincide periodically at regularly recurrent intervals with portions of the lines and spaces of one of the other grids and at regularly recurrent intervals with the lines and spaces of the other remaining grid to form two contiguous optical grids meeting in edge-to-edge relation and composed of opposed, more widely spaced wider lines, and means for effecting relative shifting of said light screens one over the face of the other to produce magnified travel of said optical grids in substantially parallel relation and whereby a slight relative movement of said screens will effect a much greater movement of said parallel travelling optical grids, one of the grids of the first mentioned two grid screens being of coarser pitch and the other being of finer pitch than the single grid of the second mentioned screen to effect movement of the two optical grids in opposite directions upon relative movement of the two screens in one direction.

4. An instrument of the character disclosed, comprising companion light screens in closely superposed relation and relatively movable one over the face of the other, one of said screens being composed of two grids in edge-to-edge relation and the other screen consisting of a single grid overlying and cooperative with both the grids of the first mentioned screen, each of the three grids being composed of parallel opaque lines and intermediate clear spaces, with the lines of each grid all of substantially the same width and substantially uniformly spaced and with the lines and spaces of one of the two grids of the first mentioned screen inclined in respect to the lines and spaces of the other of said first mentioned two grids to cause portions of the lines and spaces of the single grid to coincide periodically at regularly recurrent intervals with portions of the lines and spaces of one of the other grids and at regularly recurrent intervals with the lines and spaces of the other remaining grid to form two contiguous optical grids meeting in edge-to-edge relation and composed of opposed, more widely spaced wider lines, and means for effecting relative shifting of said light screens one over the face of the other to produce magnified travel of said optical grids in substantially parallel relation and whereby a slight relative movement of said screens will effect a much greater movement of said opposed and parallel travelling optical grids.

WALTER P. POWERS.